May 1, 1956 R. W. FREEMAN 2,743,611
TANK THERMOMETER
Filed Dec. 9, 1954
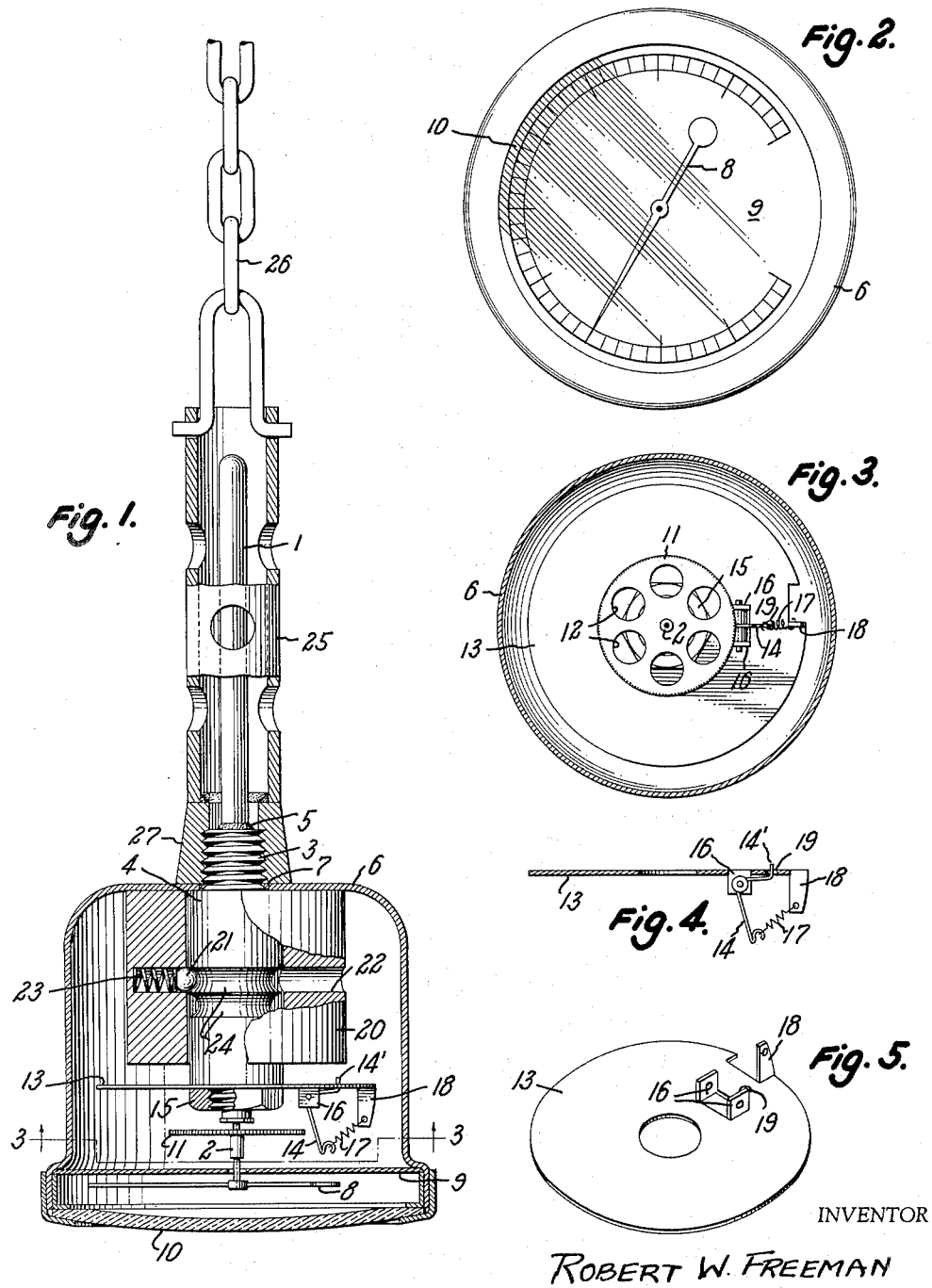
INVENTOR
ROBERT W. FREEMAN
BY Rudolph J. Sherick
ATTORNEY

United States Patent Office 2,743,611
Patented May 1, 1956

2,743,611

TANK THERMOMETER

Robert W. Freeman, East Orange, N. J., assignor to Weston Electrical Instrument Corporation, Newark, N. J., a corporation of New Jersey Application December 9, 1954, Serial No. 474,105

5 Claims. (Cl. 73—363)

This invention relates to a tank thermometer for measurement of the temperature at a desired level of a body of fluid, for example the temperature near the bottom of an oil-filled transformer tank.

Bimetallic tank thermometers having magnetically actuated mechanism for locking their pointers at the scale position developed at a desired liquid level are described and claimed in the co-pending application of Earl R. Kebbon and Robert W. Freeman, Serial No. 392,252, filed November 16, 1953. The performance of these prior tank thermometers has been entirely satisfactory but they have movable parts, including a permanent magnet, at the exterior of the thermometer casing.

An object of the present invention is the provision of tank thermometers of bimetallic type which are less expensive to manufacture than the prior instruments and in which the movable parts of the pointer locking mechanism are completely enclosed.

More specifically, an object of this invention is the provision of a tank thermometer in which the hollow stem enclosing a bimetallic element is secured to a generally cylindrical hub on which an inertia mass is impositively latched for sliding movement to actuate locking mechanism within a casing secured to the hub and housing the thermometer scale plate and pointer.

These and other objects and the advantages of the invention will be apparent from the following specification when taken with the accompanying drawing illustrating an embodiment of the invention. It will be understood that the drawing is for the purpose of illustration and is not to be construed as defining the scope or limits of the invention, reference being had for the latter purpose to the appended claims.

In the drawing wherein like reference numerals denote like parts in the several views:

Figure 1 is a substantially vertical section through a tank thermometer embodying the invention;

Figure 2 is an end elevation of the same;

Figure 3 is a transverse section on the plane of the line 3—3 of Figure 1;

Figure 4 is a side elevation of the locking lever and its mounting plate; and

Figure 5 is a perspective view of the mounting plate.

In Figure 1 of the drawing, reference numeral 1 identifies the hollow stem housing a bimetallic coil, not shown, which is connected between the closed end of the stem and a rotatable staff 2 in conventional manner. The open end of stem 1 is seated against and brazed to the threaded end 3 of a substantially cylindrical hub 4 by metal 5, and the threaded end 3 is passed through the central opening in the base of a cup-shaped casing 6 which is brazed to the hub 4 and its threaded end 3 by metal 7.

The staff 2 passes axially through a clearance hole in hub 4 and has fixed thereto a pointer 8 which it displaces over a scale plate 9 mounted in the outer end of casing 6 adjacent the transparent window or casing closure 10.

A disk 11 with a finely notched edge is secured to the staff 2 between the hub 4 and the scale plate, the disk being preferably of aluminum and provided with several perforations 12 to reduce its weight, see Figure 3. A mounting plate 13 for a locking lever 14 is secured to the outer end of hub 4 by a nut 15. Lever 14 is a bellcrank pivotally supported at the junction of its arms on ears 16 pressed from the plate 13, and its longer arm is connected by spring 17 with a flange 18 bent from the plate 13, whereby the locking lever is normally held from engagement with the edge of disk 11. In this normal position of the locking lever, as shown in the drawing, the short arm of the lever rests against the plate 13 and its bent tip 14' extends through an opening 19 of the plate.

An inertia mass or cylinder 20 is slidably mounted on the hub 4 and impositively latched in one of two alternative positions by a ball 21 mounted in a transverse bore 22 of cylinder 20 and pressed by spring 23 into one of the circumferential grooves 24 of the hub. A perforated protective tube 25 to which a suspension cable or chain 26 is attached is brazed to a nut 27 that is threaded upon the end 3 of hub 4.

To obtain a temperature reading at a desired level in a body of liquid, the instrument is lowered into the liquid and held at the desired level for a sufficient interval for the bimetallic element to assume the temperature of the liquid entering the perforated tube and contacting the stem 1. A sharp jerk is then imparted to the chain 26 and the inertia of cylinder 20 forces the latch ball 21 out of upper groove 24 of the hub 4 and permits the cylinder 20 to slide downwardly to engage the tip 14' of lever 14 and rock its longer arm into engagement with the notched edge of disk 11. This locks the pointer 8 against movement with respect to scale 9 and the instrument may be raised from the liquid without movement of the pointer by the bimetallic element as the thermometer stem rises through the liquid.

To release the locking lever 14 from disk 11, the casing is held face up and the chain end of tube 25 is brought down briskly on the palm of the hand, thereby moving cylinder 20 away from the mounting plate 13 to restore the movable parts to their respective normal positions as shown in the drawing.

It is to be understood that the invention is not limited to the exact construction herein shown and described, and that various changes and modifications which may suggest themselves to those skilled in the art fall within the spirit and scope of the invention as set forth in the following claims.

I claim:

1. The combination with a bimetallic tank thermometer including a hollow stem housing a staff, a casing secured to said staff and enclosing a scale plate and a pointer mounted on said staff, and suspension means for lowering said stem and casing into a medium whose temperature is to be measured; of a notched disk secured to said staff within said casing, a locking lever pivotally supported within said casing and engageable and disengageable with respect to said disk to lock said staff against, and unlock it to permit, angular movement, spring means normally biasing the locking lever into disengaged position with respect to the disc, and inertia-responsive means housed within said casing for engaging said locking lever and causing it to move into engagement with said disk.

2. In a tank thermometer, a hollow stem housing a staff, a pointer on said staff, a scale plate, a casing housing said pointer and scale plate, means securing said stem to said casing, said securing means including a hub within said casing and through which said staff extends, locking means comprising cooperating parts carried by said hub and staff for locking said staff against angular movement, the locking means part carried by the hub being a pivotally supported lever, spring means yieldingly urging said lever out of engagement with the locking means part carried by said staff, inertia means movably supported on said hub for engaging said lever and moving it into engagement with the cooperating part of said locking means carried by said staff, and shock-releasable means impositively latching said inertia means against movement with respect to said hub.

3. In a tank thermometer, the invention as recited in claim 2, wherein said locking means includes a mounting plate secured to said hub and pivotally supporting said lever with an end thereof projecting through said mounting plate, and said inertia means comprises a cylinder slidable on said hub between an inoperative position and an alternative position engaging said projecting end of the lever to rock the lever into engagement with said locking means part carried by the staff.

4. In a tank thermometer, the invention as recited in claim 2, wherein said hub is substantially cylindrical and provided with two circumferential grooves, said inertia means is a cylinder slidable on said hub and having a transverse bore, and the shock releasable latching means comprises a ball in the bore of said inertia mass cylinder and a spring yieldingly pressing said ball toward said hub to seat the ball in one of said circumferential grooves.

5. The combination with a bimetallic tank thermometer including a hollow stem housing a staff, a casing secured to said staff and enclosing a scale plate and a pointer mounted on said staff, and suspension means for lowering said stem and casing into a medium whose temperature is to be measured; of a notched disk secured to said staff within said casing, a locking lever pivotally supported for movement into engagement with the notched edge of said disk, spring means normally holding said locking lever out of engagement with said disk, an inertia body within said casing, means supporting said inertia body for movement from a normal inoperative position into an operative position in which it engages the locking lever to move said lever into engagement with said disk, and means impositively latching said inertia mass against movement from either of said positions, said latching means being rendered inoperative by a sharp impulse applied to said suspension means.

References Cited in the file of this patent

UNITED STATES PATENTS

| | | |
|---|---|---|
| 1,008,566 | Schubert | Nov. 14, 1911 |
| 1,495,581 | Ehrentraut | May 27, 1924 |
| 2,125,159 | Hanes | July 26, 1938 |